United States Patent [19]

Wimmer et al.

[11] Patent Number: 5,698,300

[45] Date of Patent: Dec. 16, 1997

[54] MOULDED ARTICLE MADE OF POLYTETRAFLUOROETHYLENE

[75] Inventors: Adalbert Wimmer, Vöcklabruck; Josef Bachmaier, Seewalchen, both of Austria

[73] Assignee: Lenzing Aktiengesellschaft, Austria

[21] Appl. No.: 313,219

[22] PCT Filed: Aug. 29, 1993

[86] PCT No.: PCT/AT93/00150

§ 371 Date: Sep. 29, 1994

§ 102(e) Date: Sep. 29, 1994

[87] PCT Pub. No.: WO95/04172

PCT Pub. Date: Feb. 9, 1995

[30] Foreign Application Priority Data

Jul. 30, 1993 [AT] Austria ................... 1519/93

[51] Int. Cl.$^6$ ................ B32B 07/02; D01F 08/04; D01D 05/42
[52] U.S. Cl. ........... 428/212; 428/373; 428/374; 428/422; 428/370; 264/113; 264/127; 264/147; 264/291; 156/229; 156/296
[58] Field of Search ................ 428/212, 362, 428/369, 370, 373, 374, 421, 422; 264/113, 127, 147, 342 R, 291; 156/229, 296

[56] References Cited

U.S. PATENT DOCUMENTS

| 4,551,378 | 11/1985 | Carey, Jr. ............... 428/198 |
| 5,064,593 | 11/1991 | Tamaru et al. ............ 264/113 |
| 5,225,131 | 7/1993 | Tamaru et al. ............ 264/113 |
| 5,246,772 | 9/1993 | Manning ................ 428/284 |
| 5,320,888 | 6/1994 | Stevens ................ 428/36.2 |
| 5,399,307 | 3/1995 | Dalton et al. ............ 264/113 |
| 5,418,045 | 5/1995 | Pike et al. ............... 428/198 |

FOREIGN PATENT DOCUMENTS

| 370674 | 4/1983 | Austria . |
| 2025835 | 1/1980 | United Kingdom . |

OTHER PUBLICATIONS

Ullmanns "Encyklopädie der technischen Chemis", 4th Edition, vol. 11, pp. 283–284, Verlag Chemie, date not given.

*Primary Examiner*—Marie Yamnitzky
*Attorney, Agent, or Firm*—Brumbaugh, Graves, Donohue & Raymond

[57] ABSTRACT

Figure 1:
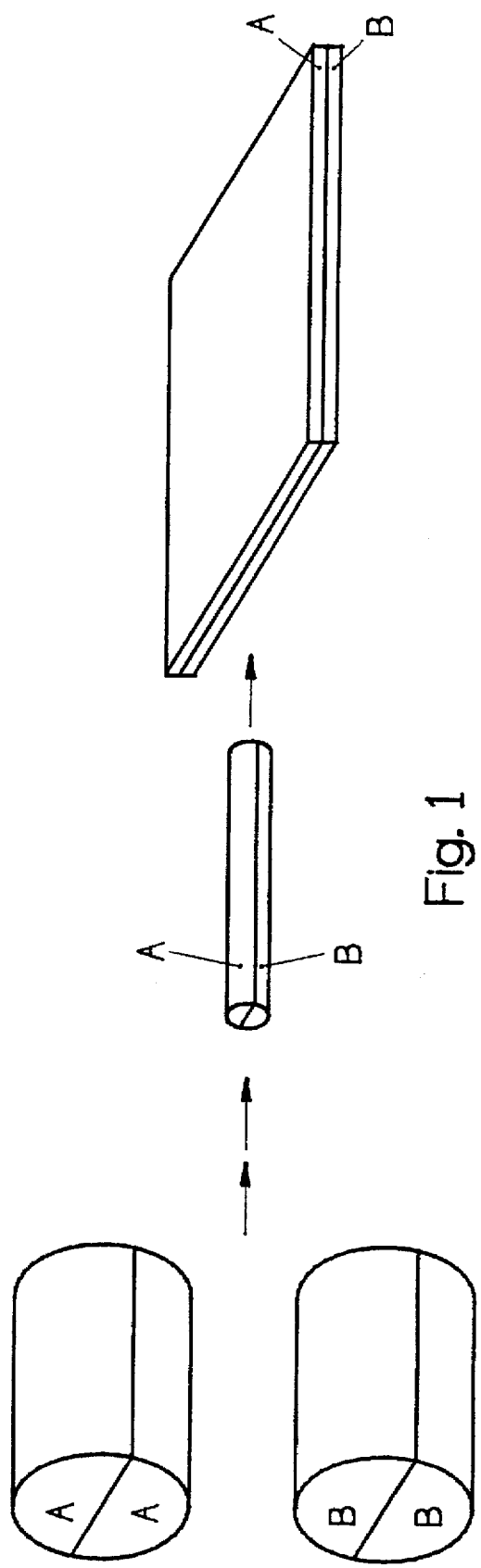

Bicomponent moulded article made of polytetrafluoroethylene (PTFE) which, in the manner of the side-by-side type, is composed of two PTFE components which shrink under the effect of heat and differ in their hot-air shrinkage by at least 1%. A preferred embodiment is in the form of a fibre which can be crimped under heat treatment. (FIG. 1)

4 Claims, 1 Drawing Sheet

MOULDED ARTICLE MADE OF POLYTETRAFLUOROETHYLENE

The invention relates to a moulded article made of polytetrafluoroethylene (PTFE) which is shaped as a film, tape or fibre, and a process for the production thereof.

Because of its thermal stability and its chemical inertness, PTFE is a valued material. AT-B 370,674 discloses monoaxially stretched films made of sintered PTFE which in the stretch direction have values for strength of between 50 N/mm$^2$ and 140 N/mm$^2$. These films are produced by first pressing PTFE powder to form a cylindrical moulded article. Subsequently the moulded article is sintered, whereupon films are peeled off, heated to temperatures of at least 327° C. and stretched.

GB-A-2 025 835 describes the production of porous PTFE moulded articles by the paste-extrusion process, a pasty composition, containing essentially PTFE powder and a lubricant, being forced through dies, whereupon the lubricant is removed by drying. Then the moulded article is heated to above the crystallite melting point of the PTFE (327° C.) and stretched during heating.

AT-B 391,473 discloses the production of a monoaxially stretched moulded article made of PTFE, a pasty PTFE powder-containing composition being continually processed to form a moulding which is led over a plurality of rollers or rolls and is heated and stretched, the moulding, before application of the stretching, being heated to a temperature between 327° and 450° C., preferably between 350° and 390° C., sintered during this and then stretched. This process permits the production of a monoaxially stretched moulded article from PTFE with strength values in the stretching direction of at least 500 N/mm$^2$ and a density of between 1.80 and 2.30 g/cm$^3$.

In order to increase the range of application of PTFE, it would be desirable for crimped fibres made of PTFE to be available. The invention therefore has the object of making available PTFE fibres having a stable and permanent crimp.

This aim is achieved according to the invention by means of a bicomponent moulded article of polytetrafluoroethylene (PTFE) which is composed, in the manner of the side-by-side type, of two PTFE components which shrink under the effect of heat and differ in their hot-air shrinkage by at least 1%. If, for example, a fibre of this kind is heated to temperatures above 200° C., it crimps insofar as it can shrink freely during the heat treatment.

It is known from the Ullmann "Encyklopädie der technischen Chemie", 4th edition, volume 11, pages 283–284, Verlag Chemie that nylon fibres can be provided with a crimp by bicomponent spinning. According to this process, two polymer melts with different properties are spun from a die hole to form a filament. In this there are in principle two possibilities for arranging the two polymers in the fibre: a core-sheath arrangement and a side-by-side arrangement. In the first arrangement, one polymer surrounds the other in the manner of a sheath and in the latter the fibres consist of two imaginary half-cylinders which are joined to one another via their planes of section. However, it is not possible to produce PTFE fibres having a stable crimp using this process.

The invention is based on the recognition that a bicomponent film consisting of two or more PTFE layers which differ in their shrink properties can be processed in a simple manner to form a crude bicomponent fibre, which can be provided with a stable crimp by heating to a temperature above 200° C.

A preferred embodiment of the bicomponent moulded article according to the invention is therefore designed as a film, tape or fibre. The fibre is expediently fibrillated.

The invention relates to a moulded article made of PTFE which is obtained by heat treatment of the aforementioned bicomponent moulded article.

A preferred embodiment of the moulded article is characterized in that it is in the form of a crimped fibre. This fibre can be processed in a conventional manner to form a needled felt consisting exclusively of PTFE. The crimped PTFE fibre has strength values of at least 300 N/mm$^2$.

It has been found that the carding properties of the fibres according to the invention are particularly good and the fibres are very especially readily suitable for forming non-woven fabrics and felts if fibres are used which are crimped and fibrillated. Using these fibres which are branched by the fibrillation, a pure PTFE felt can be produced without the use of auxiliary means. This is of great advantage since these felts, when used as filters, have a lower increase in pressure difference than felts made of matrix-spun fibres. The felts according to the invention can be readily used in medical technology.

The invention further relates to a process for producing a bicomponent film from PTFE which consists in two PTFE powder-containing compositions being processed to form a moulding of the side-by-side type which is rolled out to form a flat bicomponent moulded article which is sintered and subsequently stretched, with the proviso that PTFE powders are used which, processed to form a film, shrink to different extents under the effect of heat and differ in their hot-air shrinkage by at least 1%. It is also conceivable to process more than two PTFE powder-containing compositions to form a moulding of the side-by-side type.

A preferred modification of the process according to the invention consists in cutting the flat bicomponent moulded article to form tapes which are sintered, subsequently stretched and, if required, subjected to a fibrillation treatment.

The invention is explained in greater detail with the aid of the accompanying drawing. FIG. 1 shows diagrammatically the formation and structure of a flat bicomponent moulded article of the side-by-side type, and FIG. 2 shows diagrammatically the production of a crimped fibre made of PTFE.

According to FIG. 1, two PTFE polymers A and B which differ in their hot-air shrinkage are first mixed with lubricants and formed into the mouldings (cylinders). These cylinders are subsequently axially split along their length into two halves and in each case one half A and B used jointly in an extruder and extruded to form a strand. One half of the strand thus consists of PTFE A and the other half of PTFE B. This strand is then, in the next stage, led through a calender and rolled out to form a film. In this procedure, care should be taken that the strand runs in between the rolls such that the imaginary separating line of the two material halves lies parallel to the roll nip. Only in this manner is it ensured that a bicomponent film is actually produced. Following the calendering, the film is dried as usual and thus freed of lubricant.

Figure 2:
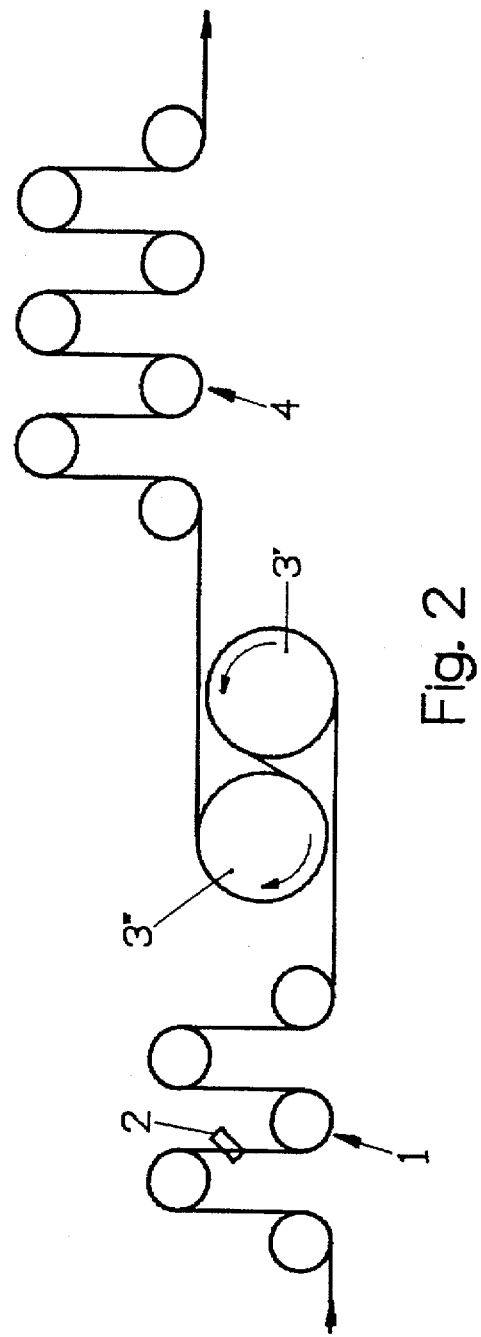

The dried film is now continuously fed to the sintering and stretching system shown diagrammatically in FIG. 2. It consists essentially of a delivery element 1, a blade bar 2, two heated rolls 3', 3" and an unheated take-off element 4, the arrows in the drawing symbolizing the direction of rotation of the heated rolls 3', 3" and the take-off direction of the film.

In order to produce tapes and fibres, the dried film is advantageously cut by the blade bar 2 as early as its passage through the delivery element 1.

The film transferred to the delivery element 1 is cut continuously into tapes by the blade bar 2, which tapes are guided further over the heated rolls 3', 3" and are sintered on these. To this end, the tapes are preferably laid in an "S" shape around the rolls in order to heat the tapes through from both sides. The rolls are heated to a temperature of at least 327° C. The stretching takes place directly after the sintering process. Takeoff is carried out by the unheated take-off element 4 which is shown with a plurality of reels in FIG. 2. In order to produce fibres, the tapes are subsequently laid over a needle roll, and are fibrillated. In order now additionally to activate the crimping, the fibre is heated without stressing to a temperature of at least 200° C., that is to say shrunk freely.

The invention is explained in even greater detail by means of the following examples.

EXAMPLE 1

PTFE powders of the types "Algoflon" DF 200 (manufacturer: Ausimont SpA) with a hot-air shrinkage of 4.5% and "Teflon" 3579 (manufacturer Dupont) with a hot-air shrinkage of 3.0% are separately treated with in each case 20% of lubricant with a boiling range of between 186° and 214° C. and are separately pressed to form cylinders. These cylinders are subsequently separated in the axial direction, exactly in the centre. One half, in each case, of the two different polymers are then used in the main pressing cylinder and pressed to form a round strand. This strand is subsequently rolled out by means of a two-roll calender to form a 0.1 mm thick film in such a manner that, over the entire width of the film, one half of the thickness of the film consists of "Algoflon" DF 200 and the other half consists of "Teflon" 3579. The film is dried, sintered at a temperature of 380° C. and stretched at this temperature in a ratio of 1:11. The film thus obtained has a thickness of 20 μm and is split into filaments by means of fibrillating rolls and cut using a cutting machine into a staple fibre having a length of 80 mm. The staple fibre obtained are further conditioned in an oven at a temperature of 250° C. for 30 minutes. The two PTFE polymers shrink to different extents during this and a crimping of 45% results. The strength of this fibre is 495 N/mm$^2$ at an elongation of 8%.

EXAMPLE 2

A film having a thickness of 50 μm is produced, stretched and subsequently fibrillated as described in Example 1. The stretching ratio is 1:12 and the film thickness obtained is 9.5 μm. The shrinking and crimping take place at a temperature of 300° C. The crimping obtained is 65%, the strength is 530 N/mm$^2$ at an elongation of 6.5%.

EXAMPLE 3

According to Example 1, "Teflon" 3579 and "Polyflon" 104 UF (manufacturer: Daikin) with a hot-air shrinkage of 5.5% are mixed with lubricant and formed into a film having a thickness of 75 μm. The stretching takes place at a temperature of 365° C. and a ratio of 1:10. The 15 μm thick film obtained is then fibrillated and shrunk in a tower heated to 300° C. and thus crimped. After the crimping thus carried out, the strand is cut into fibres. The crimping is 60%. The strength is 427 N/mm$^2$ at an elongation of 9%.

EXAMPLE 4

PTFE powder is mixed according to Example 3 and subsequently pressed to form a cylinder by filling one half of the press mould with one powder and the other half with the other powder in equal quantities. The two-component cylinder produced in this manner is processed in the manner described in Example 3 to form a fibre. The shrinkage takes place at 310° C., the crimping is 62%. The strength of the crimped fibres is 405 N/mm$^2$ at an elongation of 10%.

EXAMPLE 5

As described in Example 4, "Algoflon" DF 200 and "Hostaflon" TF 2029 (manufacturer: Hoechst), the latter possessing a hot-air shrinkage of 2.5%, are filled together into the mould, pressed to form a strand, further formed into a film and, under the conditions described in Example 1, stretched, fibrillated and thermally shrunk. The strength of the fibre obtained is 480 N/mm$^2$ at an elongation of 8%; the crimping is 50%.

We claim:

1. A molded article which comprises:

a) a first component which comprises polytetrafluoroethylene; and b) a second component which comprises polytetrafluoroethylene, wherein the first and second components are joined to one another in side-by-side relationship, wherein the first and second components differ in their hot-air shrinkage at a temperature above 200° C. by at least 1% and wherein the molded article is a fiber.

2. A molded article according to claim 1 the wherein said fiber is fibrillated.

3. A process for preparing an article of polytetrafluoroethylene, comprising the steps of:

a) processing two polytetrafluoroethylene powder-containing compositions to form a molding, wherein the molding has a first and second polytetrafluoroethylene component joined to each other in side-by-side relationship, wherein the polytetrafluoroethylene components differ in their hot air shrinkage at a temperature above 200° C. by at least 1%;

b) rolling out the molding to form a flat molded article;

c) cutting the flat molded article into tapes;

d) sintering the tapes; and e) stretching the tapes.

4. A process for preparing an article of polytetrafluoroethylene, comprising the steps of:

a) processing two polytetrafluoroethylene powder-containing compositions to form a molding, wherein the molding has a first and second polytetrafluoroethylene component joined to each other in side-by-side relationship, wherein the polytetrafluoroethylene components differ in their hot air shrinkage at a temperature above 200° C. by at least 1%;

b) rolling out the molding to form a flat molded article;

c) cutting the flat molded article into tapes;

d) sintering tapes article;

e) stretching the tapes; and f) subjecting the tapes to a fibrillation treatment.

* * * * *

UNITED STATES PATENT AND TRADEMARK OFFICE
CERTIFICATE OF CORRECTION

PATENT NO. : 5,698,300
DATED : December 16, 1997
INVENTOR(S) : Adalbert Wimmer et al.

It is certified that error appears in the above-identified patent and that said Letters Patent is hereby corrected as shown below:

First page, 2nd col., OTHER PUBLICATIONS, 1st line, "Chemis" should read --Chemie--;

Col. 3, line 36, "are" should read --is--;

Col. 4, claim 2, line 1, "claim 1 the" should read --claim 1--;

Col. 4, line 61, "tapes article" should read --the tapes--.

Signed and Sealed this

Fifth Day of May, 1998

Attest:

BRUCE LEHMAN

*Attesting Officer*  *Commissioner of Patents and Trademarks*